(12) United States Patent
Martin et al.

(10) Patent No.: US 6,679,693 B1
(45) Date of Patent: Jan. 20, 2004

(54) ADJUSTABLE WEIR ASSEMBLY

(76) Inventors: Daniel H. Martin, 3155 E. Patrick La., Suite 14, Las Vegas, NV (US) 89120; Todd E. Davis, 3155 E. Patrick La., Suite 14, Las Vegas, NV (US) 89120; Timothy Cortez, 322 Alexis Way, Windsor, CA (US) 95492; Dale R. Lewis, 1114 N. Court PMB 148, Medina, OH (US) 44256

( * ) Notice: Subject to any disclaimer, the term of this patent is extended or adjusted under 35 U.S.C. 154(b) by 0 days.

(21) Appl. No.: 09/394,411

(22) Filed: Sep. 13, 1999

(51) Int. Cl.[7] .................................................. B29C 47/90

(52) U.S. Cl. .............................. 425/69; 425/70; 425/71; 425/190

(58) Field of Search ........................... 425/190, 67, 68, 425/69, 70, 71

(56) References Cited

U.S. PATENT DOCUMENTS

| | | | | | |
|---|---|---|---|---|---|
| 2,690,663 | A | * | 10/1954 | McDermott | 210/483 |
| 3,871,807 | A | * | 3/1975 | Meyniel et al. | 425/326.1 |
| 4,090,828 | A | * | 5/1978 | Renegar | 425/192 R |
| 4,740,146 | A | * | 4/1988 | Angelbeck | 264/40.7 |
| 4,755,118 | A | * | 7/1988 | Ondush et al. | 156/498 |
| 5,480,295 | A | * | 1/1996 | Greve | 264/177.17 |

* cited by examiner

*Primary Examiner*—Jan H. Silbaugh
*Assistant Examiner*—Joseph S Del Sole

(57) ABSTRACT

A weir assembly is disclosed in which the size and shape of the opening can be easily changed, by utilizing a sizing insert system. In one embodiment, the sizing insert comprises a mechanical iris. The position of the opening is easily adjustable by utilizing at least one positioning stage that is fastened to the sizing insert. Spring plungers are utilized for retention of the transparent weir plate within the vertical channels of a water trough. A center-finder is utilized to approximately position the opening in relation to an extrusion die.

21 Claims, 4 Drawing Sheets

ADJUSTABLE WEIR ASSEMBLY

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

In common use in the extrusion industry are water troughs for cooling and setting tubing and rods of various profiles as they flow from an extrusion die. Typically two vertical channels arranged opposite each other are located at one end of each water trough, and are utilized to retain a brass weir plate. The weir plate is constructed with an opening of a shape and size that closely approximates the desired profile of the tubing or rod. Therefore, the material being extruded flows from an extrusion die, through an opening in a weir plate, and into a water trough, where the extruded material is cooled and set in its final form. A thin film of water flows between the weir plate opening and the extruded material, preventing the extruded material from adhering to the weir plate. This water is then commonly channeled back inside the water trough by utilizing hoses or other means.

The present invention relates to the adjustability of the weir opening's placement in relation to the weir plate. This is important because the water trough is typically moved away from the extruder each time the extruder is turned on, and it is often time-consuming to achieve perfect alignment between the water trough and extruder die each time. Proper alignment is necessary because the placement of the weir plate opening in relationship to the extruder die is crucial in achieving the desired profile. The distance between the weir plate opening and extruder die is important when extruding products that require precise internal dimensions.

The present invention also relates to the retention of the weir plate within a water trough, to the changeover from one extrusion profile to another, and to improved vision of the extruded material as it flows from the extrusion die and into the water trough.

2. Discussion of the Prior Art

As is shown in FIG. 1, commonly a weir plate is made of a lower portion 1 and an upper portion 2, each with half of the opening 3 that matches the desired profile. Often the opening is constructed with a counter-sunk proximal end to help guide the polymer into the opening. A new weir plate must be constructed for each new desired profile size or shape. The weir plate is commonly constructed of brass.

If the placement of the opening needs to be adjusted in relation to the extruder, the entire water trough must be moved to compensate. Moving the water trough in most cases is very awkward, and many times the stream of liquid polymer flowing through the weir plate is disrupted during the process and starts puddling on the floor. In addition, adjusting the height of one end of the water trough will change the water level, and the resulting change in depth of the tubing below the water surface will alter the water pressure and affect the shape of the tubing.

BRIEF SUMMARY OF THE INVENTION

The present invention provides for a weir plate in which the size and shape of the weir opening can be easily changed. In one embodiment this is accomplished by utilizing a replaceable sizing insert, machined with desired size and shape opening. In another embodiment, the sizing insert comprises an adjustable mechanical iris, constructed with a lever with which the exact size of the weir opening can be adjusted.

Also provided is a weir plate in which the placement of the opening is easily adjustable. This is accomplished by utilizing at least one positioning stage, with one side fastened to the weir plate, and the other side fastened to a sizing insert holder. The weir plate is constructed with an oversized hole that is covered by a sealing plate. Therefore, movement of the weir opening can be accomplished by simply adjusting the positioning stage the appropriate distance, up or down, left or right, closer to the extruder or farther from the extruder.

Ball spring plungers are provided to tightly retain the weir plate within the vertical channels located in the typical water trough. Alternatively, a threaded tenor can be retained within a threaded portion of the weir plate and can be turned until it extends out of the weir plate the distance required to create a snug fit within the end of the water trough.

A tapered center-finder is provided that is used to rough-align the weir opening with the extruder die. The center-finder is simply placed inside the sealing plate assembly, and the weir opening is adjusted up or down, left or right, until the tapered end of the center-finder fits into the extrusion die center. After this, the extruder operator proceeds to place the sizing insert in the sealing plate assembly, and adjusts the positioning stage as needed after extrusion begins. The non-tapered end of the center-finder is used as a tool to help separate the sizing insert from the sizing insert holder when a different sizing insert is desired.

Stainless steel, polytetrafluoroethylene, or other heat and corrosion resistant materials are used because of the proximity to water and extreme heat. Polytetrafluoroethylene has the additional advantage of having nonstick properties.

The weir plate is preferably constructed of polycarbonate or other transparent material to improve visibility during set-up.

One of the advantages obtained with the present invention is providing for quick start-up each day, and quick changeover time between different profiles, which reduces manufacturing costs, and ultimately results in a lower retail price for the end product.

BRIEF DESCRIPTION OF TIE SEVERAL VIEWS OF THE DRAWINGS

Advantageous modifications and features of the invention can now be easier understood by reference to the following detailed description thereof, taken in conjunction with the accompanying drawings; in which.

DETAILED DESCRIPTION OF THE INVENTION

Figure 1:
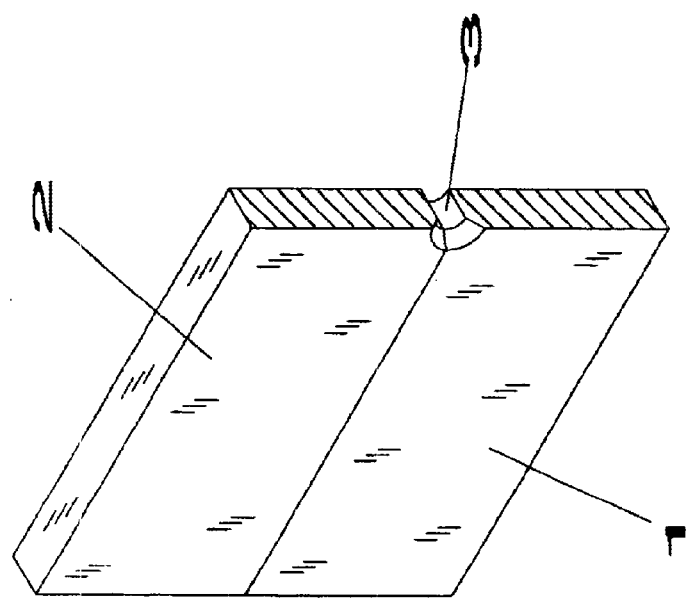
FIG. 1 illustrates a cross-sectional isometric view of a prior art weir plate.
Figure 2:
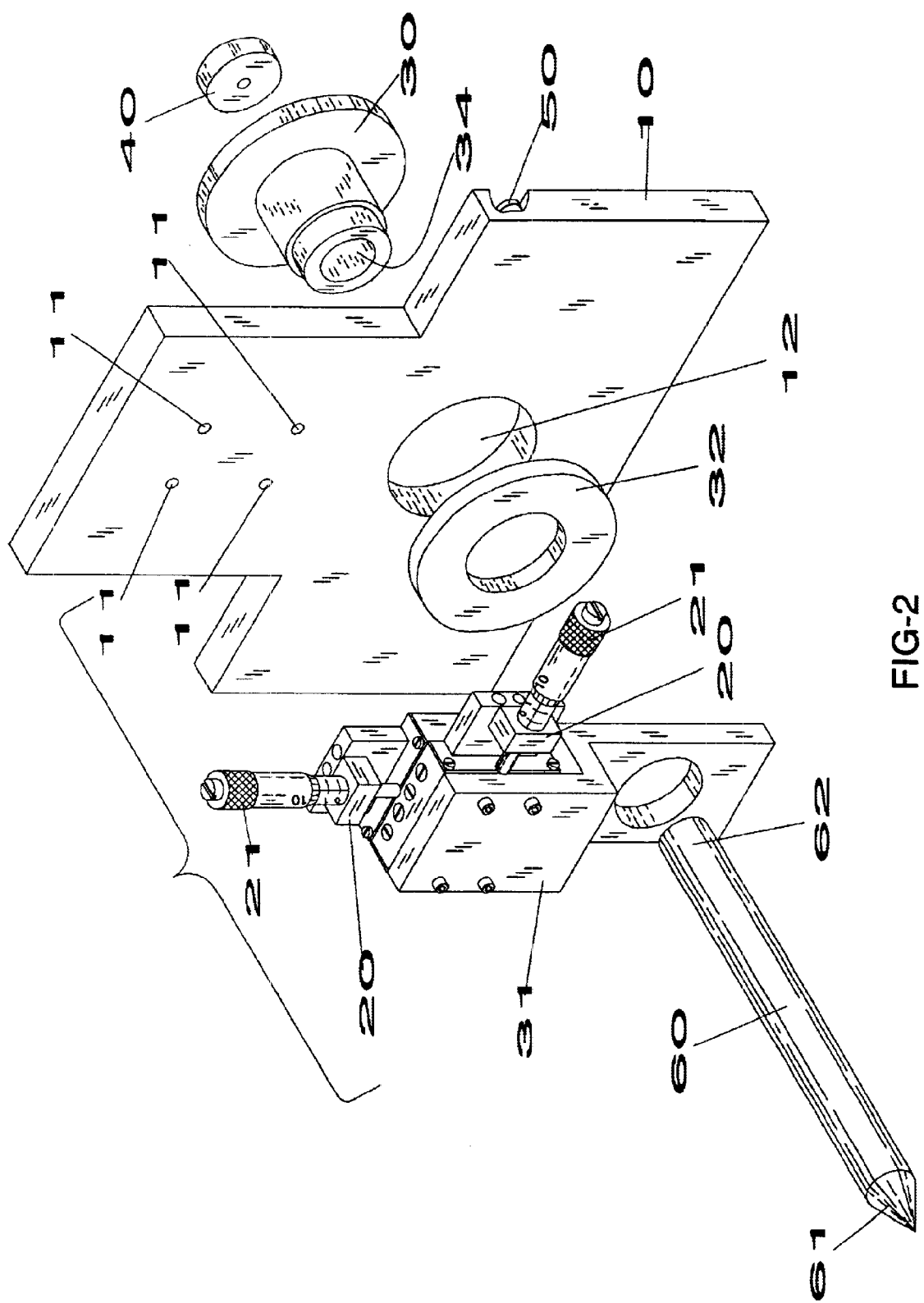
FIG. 2 illustrates an exploded isometric view of a two axis embodiment of the inventive adjustable weir plate assembly and center-finder.
Figure 3:
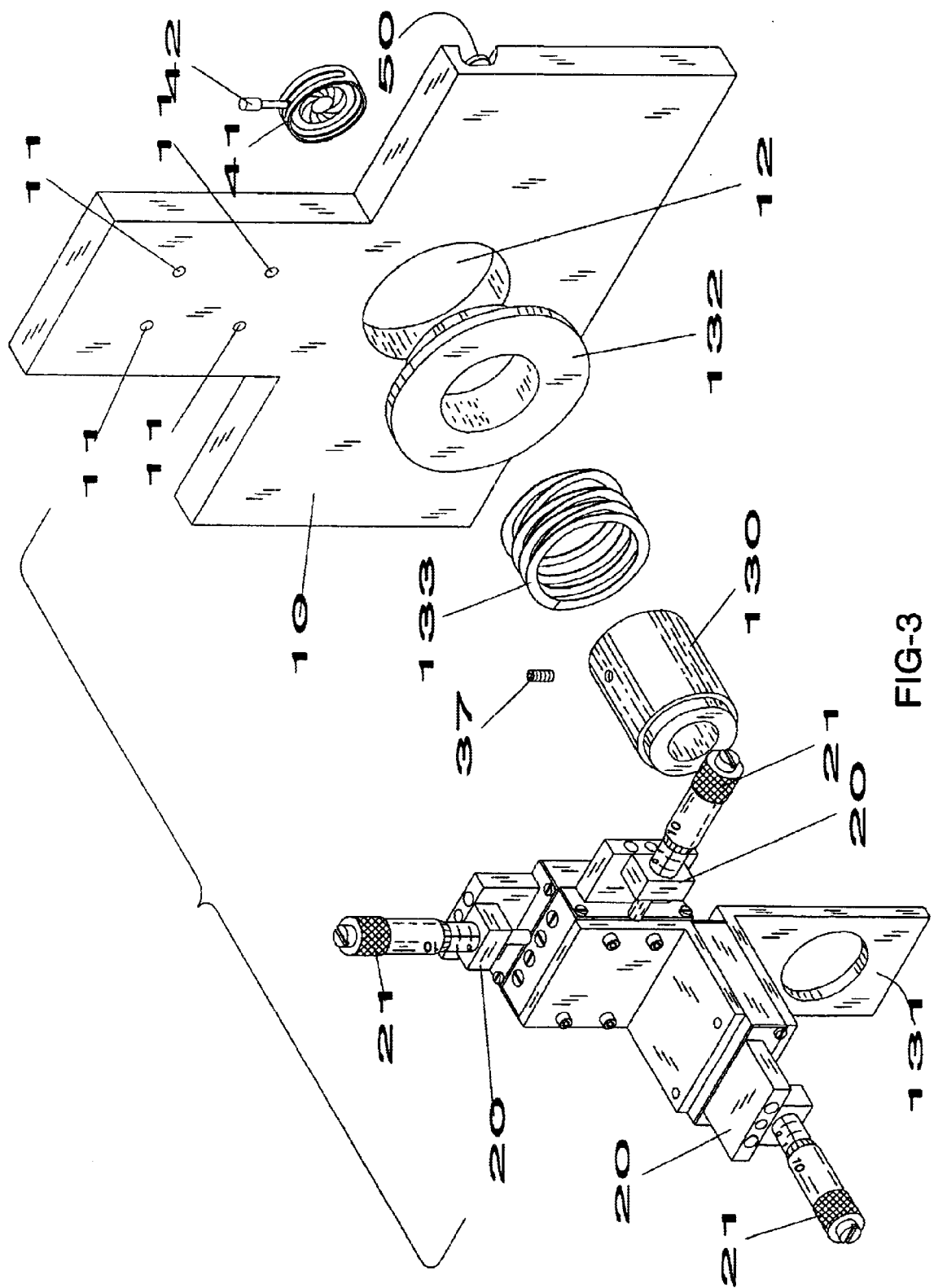
FIG. 3 illustrates an exploded isometric view of a three axis embodiment of the adjustable weir plate assembly.
Figure 4:
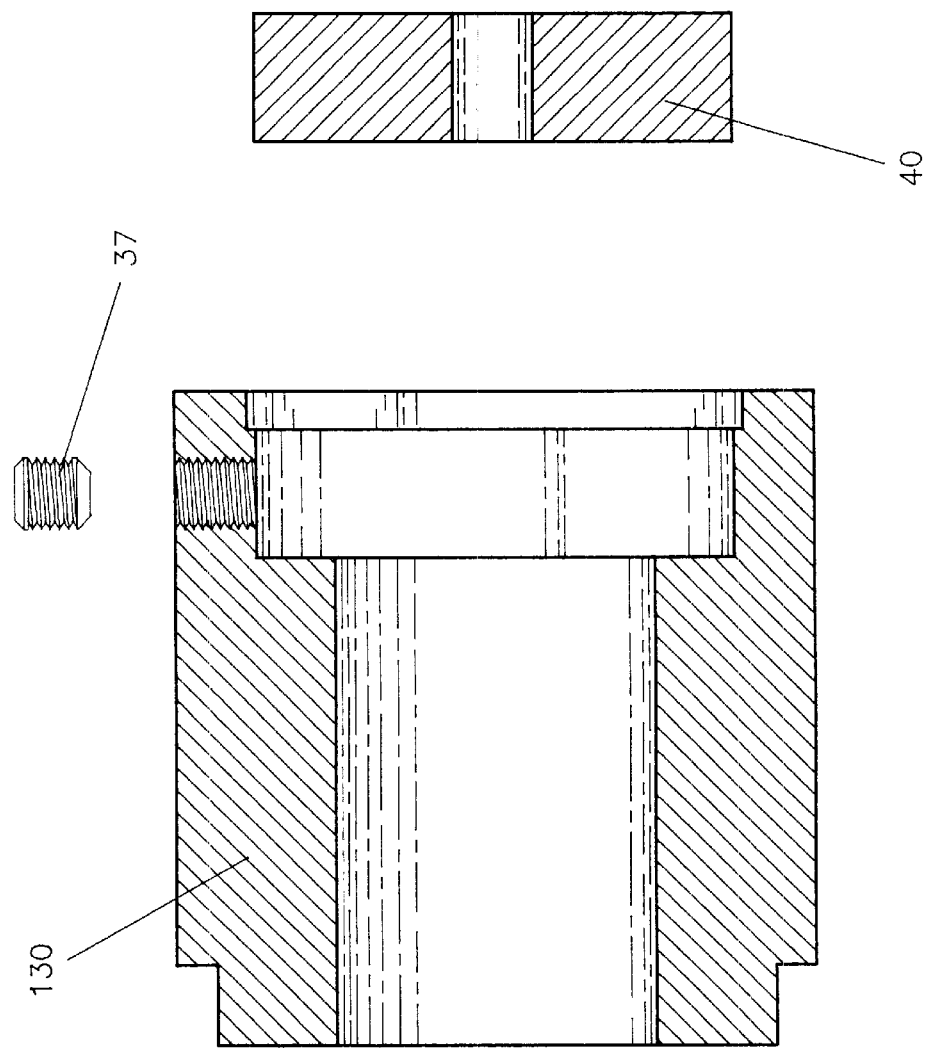
FIG. 4 illustrates an exploded cross-sectional view of the inventive sizing insert and sizing insert holder of the three axis embodiment of the adjustable weir plate assembly.

The illustrated adjustable weir plate assembly consists of a preferably transparent wear plate 10; at least one positioning stage 20; a sifting insert holder 30, 130; a bracket 31,131; a seal plate 32, 132 or sealing surface constructed on the sizing holder; and a sizing insert 40, 41.

Threaded holes 11 or threaded inserts are used for permanently fastening the positioning stage 20 to the weir plate 10. The bracket 31, 131 is used to permanently fasten the sizing insert holder 30, 130 to the positioning stage 20.

The positioning stage 20 is preferably constructed with threaded micrometer dials 21 which when rotated move the bracket 31,131; and in turn the sizing insert holder 30, 130.

The weir plate 10 is constructed with a through-hole 12 used to limit the travel of the sizing insert holder 30, 130. A sealing plate 32, 132; constructed of an exterior diameter significantly larger than that of the weir plate hole 12; is attached to the sizing inset holder 30, 130. The sealing plate 32, 132 is constructed of dimensions which provide for a seal between the sea plate 32, 132 and sizing inert holder 30, 130 but which also allow the sealing plate 32, 132 to slide back and forth on the sizing insert holder 30, 130 A wave spring 133 between the bracket 131 and sealing plate 132 maintains constant pressure against the sealing plate 132 to provide a seal between the sealing plate 132 and the weir plate 10.

The sizing insert holder 30, 130 hag a proximal end, which in use is located closest the extruder, and a distal end that is connected to the bracket 31, 131. The sizing inset holder 30, 130 is constructed with a through-hole 34, preferably located at the center of the sizing insert holder 30, 130. At the proximal end of the through-hole 34 the sizing inserts 40, 41 are housed. A set screw 37 retains the sizing insert 41 within the sizing insert holder 130. The sizing insert 41 comprises a mechanical iris with a lever 42 which is used to change the sire of the opening.

A tapered center-finder 60 is utilized to rough-align the sizing insert holder's through-hole 34 with the extruder die. The tapered end 61 of the center-finder 60 is simply placed inside the sizing insert holder 30, 130, and the weir assembly is moved until the center-finder 60 is appropriately aligned with the extrusion die. After this, the extruder operator proceeds to place the sizing insert 40, 41 into the sizing insert holder 30, 130, and rotates the micrometer dials 21 of the positioning stages 20 as needed for final alignment.

The non-tapered end 62 of the center-finder 60 is used to help separate the sizing insert 40, 41 from the sizing insert holder 30, 130 when a different sizing insert 40, 41 is desired.

Ball spring plungers 50, comprising a ball and spring, are attached to the weir plate 10. The spring exerts outward pressure on the ball, and prevents undesired movement of the weir plate 10 when inserted into the vertical channels of the typical water trough.

References herein to the details of the illustrations are by way of example only and not intended to limit the scope of the claims which themselves recite those details regarded as important to the invention.

What is claimed is:

1. A weir assembly comprising:
   a) a water trough;
   b) a weir plate connected with a through-hole and attached to said water trough;
   c) a sizing insert holder located within said through-hole, constructed with an opening therein; and
   d) adjustment means for moving said sizing insert holder within said weir plate through-hole, whereby the location of the sizing insert holder in relation to the weir plate can be changed.

2. The weir assembly of claim 1 further comprising a sizing insert attached to the sizing insert holder.

3. The weir assembly of claim 2 wherein the sizing insert is constructed of polytetrafluoroethylene or other material with nonstick properties.

4. The weir assembly of claim 2 further comprising an alignment rod, whereby the rod is placed within the weir plate through-hole, and the weir assembly is moved until the rod is appropriately aligned with the extrusion die.

5. The weir assembly of claim 4, wherein one end of said rod is constructed with a conically tapered end.

6. The weir assembly of claim 2 wherein said sizing insert comprises an iris diaphragm which can be readily adjusted when a different size opening is desired.

7. The weir assembly of claim 1 wherein the sizing insert holder is constructed of polytetrafluoroethylene or other heat resistant material.

8. The weir assembly of claim 1, further comprising sealing means for sealing between the sizing insert holder and weir plate.

9. The weir assembly of claim 8 wherein said sealing means comprises at least one sealing surface constructed on the sizing insert holder.

10. The weir assembly of claim 8 wherein said sealing means comprises at least one sealing plate attached to the sizing insert holder.

11. The weir assembly of claim 1 further characterized in that the sizing insert holder adjustment can occur in at least two axes, and comprising two rotatable threaded rods, whereby the first rotatable rod will control movement in a first axis, and the second rotatable rod will control movement in a second axis.

12. The weir assembly of claim 1 further characterized in that the sizing insert holder adjustment can occur in the three axes of the Cartesian coordinate system, and comprising three rotatable threaded rods, whereby the first rotatable rod will control movement in a first axis, the second able rod will control movement in a second axis, and the third rotatable rod will control movement in a third axis.

13. The weir assembly of claim 1 wherein said adjustment means comprises at least one positioning stage comprising:
   a) a fist portion fastened to said plate;
   b) a second portion attached to said sizing insert holder; and
   c) at least one rotatable threaded rod, whereby when the threaded rod is rotated, the sizing insert holder location will be changed in relation to the weir plate.

14. The weir assembly of claim 13 comprising a first positioning stage for adjusting the sizing insert holder placement along a first axis, and a second position stage for adjusting the sizing insert holder placement along a second axis.

15. The weir assembly of claim 14 further comprising a third positioning stage for adjusting the sizing insert holder placement along a third axis.

16. The weir assembly of claim 15 further characterized in that the three axes of movement correspond to the axes of the Cartesian coordinate system.

17. The weir assembly of claim 1, further comprising retaining means to prevent undesired movement of the weir plate within the channels of a water trough.

18. The weir assembly of claim 17, wherein said retaining means comprises at least one spring-loaded mechanism.

19. The weir assembly of claim 17, wherein said retaining means comprises at least one threaded fastener.

20. The weir assembly of claim 19, wherein said threaded fastener is retained within a threaded portion of the weir plate and can be turned until it extends out of the weir plate the distance required to create a snug fit within the end of the water trough.

21. The weir assembly of claim 17, wherein the weir plate is constructed of polycarbonate or other transparent material.

* * * * *